Sept. 10, 1940.                J. DUNLOP                2,214,580
MOVING STAIRWAY
Original Filed June 26, 1937
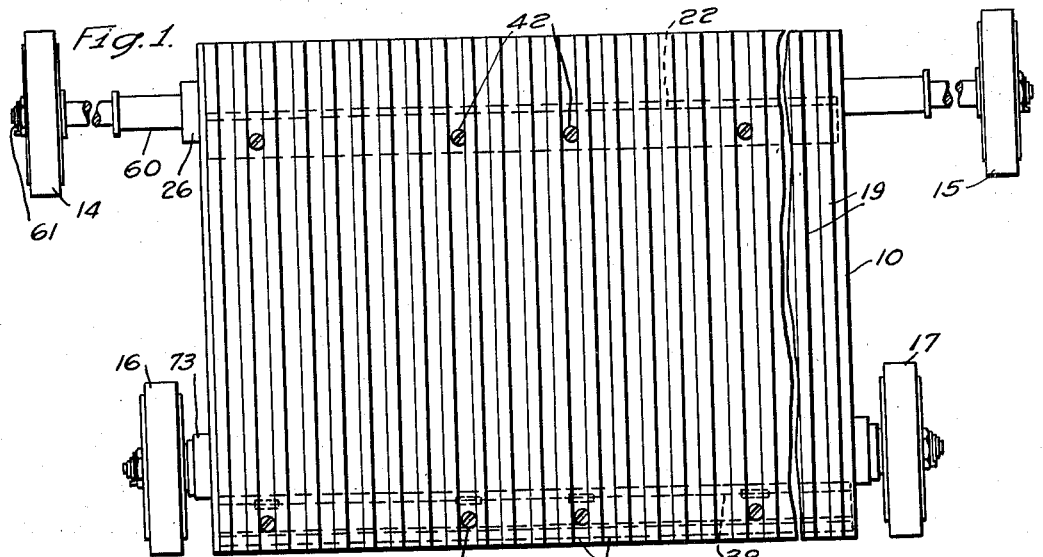
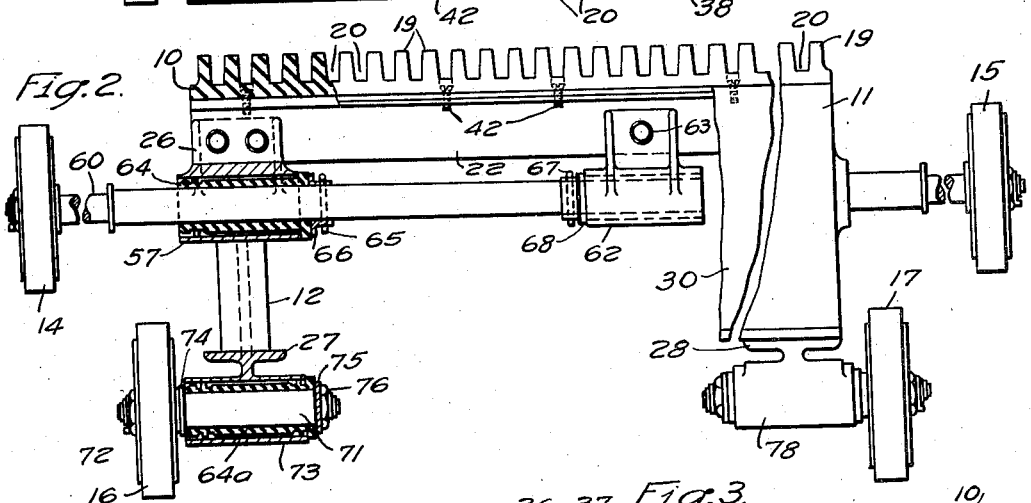
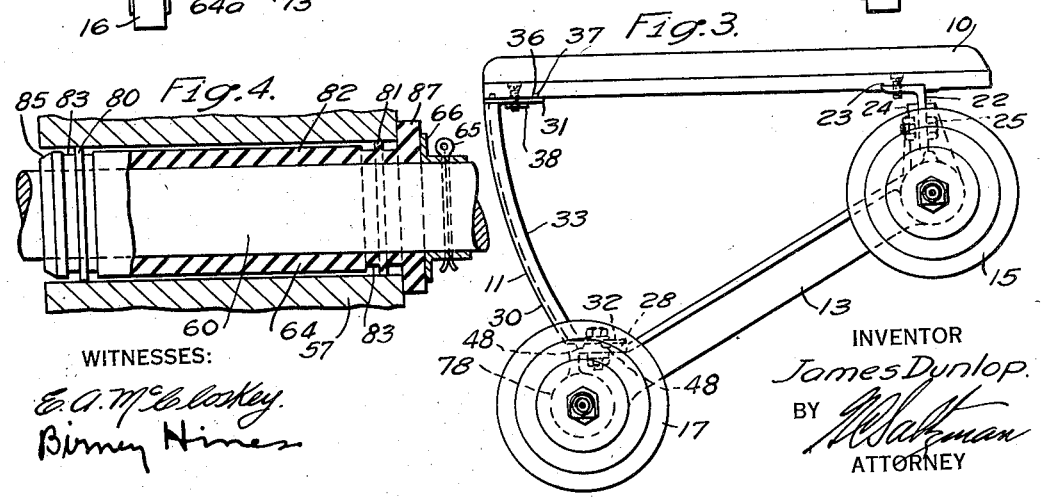
WITNESSES:
E. A. McCloskey
Birney Hines
INVENTOR
James Dunlop.
BY
ATTORNEY Patented Sept. 10, 1940

2,214,580

UNITED STATES PATENT OFFICE 2,214,580

MOVING STAIRWAY

James Dunlop, Ridgewood, N. J., assignor to Westinghouse Electric Elevator Company, Chicago, Ill., a corporation of Illinois Original application June 26, 1937, Serial No. 150,492. Divided and this application March 30, 1938, Serial No. 198,867

8 Claims. (Cl. 308—26)

My invention relates to moving stairways and more particularly to the steps embodied therein and is a division of my application Serial No. 150,492, filed June 26, 1937 and assigned to the Westinghouse Electric Elevator Company.

One object of my invention is to provide a moving stairway step which shall be simple and economical to manufacture and which shall be quiet and easily maintained in operation under varying conditions.

A further object is to provide for obtaining quietness in the operation of moving stairway steps when they are carrying passengers as well as when they are not carrying passengers.

A further object is to provide for absorbing the vibrations of a moving stairway step in one manner when it is traveling under no load and for absorbing the vibrations of the step in another manner when it is traveling under a load.

It is also an object to provide for the automatic transfer of the step from one vibration preventing means to another vibration preventing means when the load condition of the step changes.

For a better understanding of the invention reference may be had to the accompanying drawing, in which:

Figure 1 is a top plan view of a step for a moving stairway;

Fig. 2 is a view in rear elevation, partly in section, of the step shown in Fig. 1, and the bushings for the axles supporting the step.

Fig. 3 is a view in right-hand end elevation of the step shown in Fig. 1; and

Fig. 4 is an enlarged view, partly in section, of one of the resilient bushings mounted on the step axles for decreasing the vibration of the step.

Referring more particularly to the drawing, I have illustrated a moving stairway step as comprising a step tread 10, an apron or riser 11, a pair of end bars 12 and 13, a pair of leading rollers 14 and 15 and a pair of trailing rollers 16 and 17.

The step tread 10 may be constructed of any suitable material, preferably of molded fibrous material, with a heat hardened binder, and it may be constructed in a plurality of sections or in one complete section provided with a plurality of cleats 19 disposed on its upper surface to provide a plurality of grooves 20. The tread is supported by resting its rear edge upon the upper edge of the riser 11 and its front edge upon an angle iron 22. The angle iron extends from the end bar 12 to the end bar 13. The underside of the tread is provided with a groove 23 which receives the angle iron 22 to prevent the tread from working forward or backward. The angle iron is supported in position by securing one end to a bracket 24 on the upper portion of the end bar 13 by suitable bolts 25. The other end of the angle iron is secured in a like manner to a bracket 26 on the upper portion of the end bar 12. The lower ends of the bars 12 and 13 are provided with suitable brackets 27 and 28 for supporting the lower edge of the apron 11.

As shown in Figs. 2 and 3, the apron 11 comprises a sheet 30, preferably of stainless steel, bent into a slight upward curve and having its upper edge 31, its lower edge 32 and its end edges 33 bent inwardly substantially at right angles to the face of the riser. The upper bent-in edge 31 is provided with small upwardly extruded portions 36 disposed to enter grooves 37 in the underside of the tread 10 to assist in holding the tread in its correct position.

A tapped bar 38 is spot welded to the underside of the bent in edge 31 to act as a stiffening bar and to also provide a plurality of tap holes disposed to receive a plurality of screws 42 which pass through the tread 10 and hold it in position on the riser 11. The inturned lower edge 32 of the riser is bolted to the cooperating lugs 27 and 28 on the end bars 12 and 13. The inturned edge 32 is also provided with downwardly extruded portions 48 disposed to be seated in cooperating grooves in the brackets 27 and 28, respectively, at the lower ends of the bars 12 and 13, to aid in maintaining the riser plate in its correct position on the end bars.

Referring to the rollers on the step, the leading roller 14 is mounted upon the outer end of a front axle 60 and is held in position thereon by a nut 61. The axle is mounted in an axle support 57 on the front or upper portion of the end bar 12 and in an axle support bracket 62 attached to the cross angle iron 22 by a bolt 63. The axle is held in the brackets 57 and 62 by resilient bushings 64, preferably of rubber or similar material. A cotter pin 65 is disposed through a collar 66 on the axle 60 to prevent its movement to the left, and a similar cotter pin 67 and collar 68 are disposed adjacent to the bracket 62 to prevent the axle from moving to the right. The leading roller 15 at the right is mounted in the same manner as the roller just described.

The trailing roller 16 is rotatably mounted upon the outer end of a stub axle 71 and is secured thereon by a suitable nut 72. The stub axle is mounted in the trailing axle support 73 by means of a resilient sleeve 64a which is retained in position by a pair of suitable washers 74 and 75. A nut 76 on the inner end of the stub axle holds the combination firmly in position. The trailing roller 17 is mounted upon a stub axle disposed in the trailing roller support 78 in the same manner as the stub axle for the trailing roller 16 is mounted in its support.

In the steps heretofore constructed, the resilient bushings 64 and 64a have been constructed usually of a solid resilient material, but in practicing my invention I provide a resilient bushing having two different surfaces for supporting the step in order to decrease its vibration and enable it to be operated without the noise that usually accompanies moving stairway steps. By referring to Fig. 4, it will be seen that the bushing 64 is provided with a no-load bearing surface comprising a pair of narrow circular ridges 80 and 81 extending entirely around the axle bushing to engage the inner surface of the axle support bracket in which the bushing is mounted for the purpose of supporting the step while it is operating without load. The bushing is also provided with a load bearing surface 82 of less diameter than the no-load surface and which is disposed to receive and support the axle support bracket when the step is carrying a load such as that of a passenger. A groove 83 is disposed at each side of each of the ridges 80 and 81 to provide room for the ridge of resilient material to spread or flow into when a load on the step bears the bracket downwardly to where it engages the load bearing surface 82. The bushing is also provided with a beveled end 85 to enable it to be easily positioned in the bracket during the assembling of the step parts. A shoulder 87 is disposed on the other end of the bushing to provide a seat for the collar 66 through which the cotter pin 65 passes.

Each axle support bracket is provided with a similar bushing, and it will be apparent that when the step is running with no load, the ridges 80 and 81 on each of the bushings will support the bracket on their thin outer faces and that the tendency for the step to vibrate in a disturbing manner will be eliminated by reason of the light resilient support on which it rests. It will also be apparent that when the step is loaded, as by a passenger standing thereon, the weight of the load will cause the brackets to overcome the slight resilient support of the ridges 80 and 81 and move down to rest upon the face 82 of the central portion of the bushing, and that in this position the loaded step will be firmly but resiliently supported in such manner that practically all vibration because of its loaded condition will be eliminated, and, therefore, that the step will operate quietly and without any disturbing noise.

Although I have illustrated and described only one moving stairway step embodying my invention, it will be obvious that many changes and modifications may be made therein without departing from the spirit and scope of the invention.

I claim as my invention:

1. A bushing for an axle of a load carrying device comprising a cylindrical resilient sleeve having a cylindrical heavy load carrying surface and a cylindrical light load carrying surface, said light load carrying surface having a load bearing surface of less area than the heavy load carrying surface and having a greater diameter than the diameter of the heavy load carrying surface, and a groove disposed between the heavy load carrying surface and the light load carrying surface to permit displacement of the light load carrying surface to a position level with the heavy-load carrying surface when it is compressed by a heavy load.

2. A bushing for an axle of a load carrying device comprising a cylindrical rubber sleeve having an outer cylindrical heavy load carrying surface, a pair of outer cylindrical light load carrying surfaces of greater diameter and less area than the heavy load carrying surface, and grooves disposed between the light load carrying surfaces and the heavy load carrying surface to permit displacement of the light load carrying surfaces when a load thereon exceeds a predetermined value.

3. A moving stairway step having an axle, a tread supporting member mounted on the axle, and a bushing of resilient material disposed between the axle and the tread supporting member, said bushing having a no-load surface extending transversely of the axis of the axle for supporting said member when the step has no load and having a load surface of more than twice the area of the no-load surface for supporting said member when the step is loaded.

4. A moving stairway step having an axle, a tread supporting member mounted on the axle, and a bushing of resilient material disposed between the axle and the tread supporting member, said bushing having on its outer surface a load surface disposed in parallel with and transversely of the longitudinal axis of the bushing and a no-load surface of less than one-half the area of the load surface to prevent the tread supporting member from engaging the load surface when the step has no load.

5. A moving stairway step having an axle, a tread supporting member mounted on the axle, and a bushing of resilient material disposed between the axle and the tread supporting member, said bushing having a no-load surface for supporting the step when it is not loaded, a load surface for supporting the step when it is loaded, and a groove transverse to the axis of the axle between the load surface portion and the no-load surface portion to permit the no-load surface portion to expand therein when it is leveled with the load surface by the weight of a load on the step.

6. A moving stairway step having an axle, a tread supporting member, and a cylindrical bushing of rubber like material disposed on the axle and concentric therewith for supporting the tread-supporting member, said bushing having a load surface of revolution parallel to the axis of the axle and a no-load ridge of less than half the area of the load surface and of greater diameter than the load surface and having a groove between the load surface and the no-load surface of less diameter than the load surface to permit the no-load surface portion to expand therein when a load on the step presses the tread supporting member down into engagement with the load surface.

7. A moving stairway step comprising a tread member, an axle for carrying the tread member, and a bushing of rubber-like material disposed between the axle and the tread member, said bushing having grooves transverse to the axis of the axle in its bearing surface providing a no load surface for supporting the tread member when the step is not loaded and a load surface to be out of engagement with the tread member when the step member is not loaded but to be engaged by the tread member when the step is loaded.

8. A moving stairway step comprising a tread member, an axle for carrying the tread member, a bushing disposed between the axle and the tread member, said bushing having a light load section of rubber-like material for supporting the tread member when the step is not loaded and a heavy load section of rubber-like material disposed to be out of engagement with the tread member when the step is not loaded but to be engaged by the tread member when the step is loaded to prevent a metal-to-metal engagement between the tread member and the axle at any time.

JAMES DUNLOP.